(12) United States Patent
Lee et al.

(10) Patent No.: US 12,285,114 B2
(45) Date of Patent: Apr. 29, 2025

(54) CONNECTING WEDGES AND SYSTEMS FOR SOFA ASSEMBLY

(71) Applicant: Zinus Inc., Gyeonggi-do (KR)

(72) Inventors: Younjae Lee, Gyeonggi-do (KR); Munhan Bae, Gyeonggi-do (KR); Keunyoung Kim, Gyeonggi-do (KR)

(73) Assignee: ZINUS INC., Gyeonggi-Do (KR)

( * ) Notice: Subject to any disclaimer, the term of this patent is extended or adjusted under 35 U.S.C. 154(b) by 105 days.

(21) Appl. No.: 18/163,126

(22) Filed: Feb. 1, 2023

(65) Prior Publication Data

US 2023/0284779 A1 Sep. 14, 2023

Related U.S. Application Data

(63) Continuation-in-part of application No. PCT/CN2021/107505, filed on Jul. 21, 2021.

(30) Foreign Application Priority Data

Aug. 17, 2020 (CN) .......................... 202021717179.X (51) Int. Cl.
*A47C 4/02* (2006.01)
(52) U.S. Cl.
CPC .............. *A47C 4/021* (2013.01); *A47C 4/028* (2013.01); *F16B 2200/30* (2018.08)
(58) Field of Classification Search
CPC ......... A47C 4/021; A47C 13/005; A47C 7/42; A47C 7/546; F16B 2200/30; F16B 12/20; F16B 12/32

(Continued)

(56) References Cited

U.S. PATENT DOCUMENTS 971,615 A * 10/1910 Humphries ............... F16B 5/02
403/381
1,272,131 A * 7/1918 Silberg .................. E04B 1/2604
52/848

(Continued)

FOREIGN PATENT DOCUMENTS

CN 204743347 U 11/2015
CN 207574888 U 7/2018

(Continued)

OTHER PUBLICATIONS

PCT/CN2021/107505 International Search Report and Written Opinion dated Sep. 28, 2021 (w/ English translation).

*Primary Examiner* — Milton Nelson, Jr.
(74) *Attorney, Agent, or Firm* — Wilson Sonsini Goodrich & Rosati (57) ABSTRACT

The present disclosure provides a connector, comprising an installation surface, a first reclined surface and a second reclined surface respectively located on two sides of the installation surface, and a connection surface opposite to the installation surface; the first reclined surface and the second reclined surface extend from the installation surface to the connection surface, and the distance between the first reclined surface and the second reclined surface gradually increases from the installation surface to the connection surface. The present invention also discloses a connection assembly and a sofa. The present invention makes the connection convenient, the assembly simple, and the production cost low.

19 Claims, 11 Drawing Sheets

(58) Field of Classification Search
USPC .......... 297/440.14, 440.13, 440.16, 440.21;
403/381, 367, 374.1, 375, 380, 409.1,
403/334, 336, 358
See application file for complete search history.

(56) References Cited

U.S. PATENT DOCUMENTS

| | | | | |
|---|---|---|---|---|
| 5,244,300 | A * | 9/1993 | Perreira | ............. E04B 5/43 |
| | | | | 403/333 |
| 5,403,109 | A * | 4/1995 | Johnson | ......... F16B 12/2036 |
| | | | | 403/231 |
| 5,433,416 | A * | 7/1995 | Johnson | ........... B65D 23/003 |
| | | | | 403/381 |
| 10,138,917 | B2 * | 11/2018 | Koch | ................. F16B 5/01 |
| 2010/0207442 | A1 * | 8/2010 | Hrib | ............... A47C 13/005 |
| | | | | 297/440.14 |
| 2011/0255915 | A1 * | 10/2011 | Chen | ............... F16B 12/125 |
| | | | | 403/381 |
| 2021/0068547 | A1 * | 3/2021 | Hodgson | ............ A47C 7/42 |

FOREIGN PATENT DOCUMENTS

| | | | | |
|---|---|---|---|---|
| CN | 208850914 U | 5/2019 | | |
| CN | 210540189 U | 5/2020 | | |
| CN | 213308563 U | 6/2021 | | |
| DE | 4431988 A1 | 3/1996 | | |
| FR | 2699058 A1 * | 6/1994 | ........... | A47C 13/005 |
| WO | WO-2022037351 A1 | 2/2022 | | |

* cited by examiner

CONNECTING WEDGES AND SYSTEMS FOR SOFA ASSEMBLY

CROSS-REFERENCE

This application is a continuation-in-part application of International Application No. PCT/CN2021/107505, filed Jul. 21, 2021, which claims the benefit of and priority to Chinese Patent Application No. 202021717179.X filed on Aug. 17, 2020, each of which is incorporated herein by reference in its entirety for all purposes.

BACKGROUND

Nowadays, sofa assembly often consist of components (such as armrests, frames, and backrests, etc.) that are assemblable and disassemblable for easy packaging, storage (e.g., in a warehouse, in a user's storage area) and shipping (e.g., when shipping to a user). After being manufactured and/or disassembled for packaging, storage, and shipping, it may require to be assembled in an easy, fault-proof manner by an end user.

SUMMARY

The present disclosure provides a sofa assembly that can be easily assembled. In another aspect, the present disclosure provides a connecting wedge that may provide easy connections between sofa components. In another aspect, the present disclosure provides a connection wedge assembly that may comprise corresponding connecting wedges that provide easy connection between sofa components.

Currently, the conventional way to connect sofa components, such as armrests, frames, and backrests, or to connect two frames together, is through a slot structure. This involves one slot insertion element being inserted into another slot receiving element. The slot receiving element is typically made up of a connecting plate, and two side plates located on either side of the connecting plate. The distance between the side plates decreases from one side to the other (e.g., from top to bottom), and the ends of the side plates are bent inward to create limit parts. The connecting plate, side plates (e.g., including the limit parts) create an insertion space for receiving the corresponding insertion element. However, one disadvantage of this slot structure is that it demands high accuracy in the manufacturing process. If there is an error in the production of one or both of the two slot structures/elements, it can lead to difficulties in aligning them during assembly. This is because if the slot structures/elements are not manufactured to the precise dimensions required, they may not fit together properly, making it difficult to align them. This can result in misalignment, difficulty in fitting the pieces together and even the risk of damaging the structures/elements during assembly. This is one of the drawbacks of using a slot structure for connection which demands high precision in the manufacturing process and even small errors can cause difficulties during assembly. After assembly, the error in the production of the slot structures/elements may cause the sofa to be unstable, have loose connections, or even be unsafe for use. The misalignment caused by the manufacturing error may lead to the sofa being wobbly or having a weak structure. Additionally, the loose connections could cause the sofa to come apart during use, posing a risk of injury to the user. In some cases, the misalignment may also cause the sofa to look uneven or asymmetrical.

Additionally, because the two slot structures/elements have different shapes, it requires two different molds and/or production lines, resulting in higher production costs. Having different molds for each slot structure/element requires additional resources such as time, money, and space for storage. Additionally, the need for multiple production lines means that the production process will be less efficient, leading to increased costs. Also, having different molds for each slot structure/element means that it is necessary to switch between molds during production, which can also lead to downtime and increased labor costs. This can add up to a significant increase in overall production costs.

Because the connecting wedge is used to connect sofa components, which generally have a soft surface, the soft surface may sometimes produce a structural short-term bending effect. The soft surface of the sofa components, such as the side surfaces of the frames, armrests, and backrests, can cause the components to bend or compress temporarily, for example, during the assembly process. In some cases, the connecting wedges are installed to the sofa components using one or more bolts. These bolts sometimes not only secure the wedges to the soft surface of the sofa, but also to the inner frame, such as a wooden or metal fixing plate. Once installed, the soft material at the position of the connector is compressed, and the connector is slightly indented and secured to the inner frame. However, if the connector is only installed with one bolt, and the inner fixing plate is not very thick, or the bolts are not tightened properly, structural short-term bending may occur. Because the connecting wedges are attached to the sofa surfaces, this structural short-term bending effect may lead to a difficulty to align the connecting wedges. To accommodate for this potential short-term bending effect, there exist needs for connecting wedges that are designed in a manner to allow for this temporary bending of the sofa components surface (and the connecting wedges attached to the surfaces) when assembling the sofa components together, but still provide an easy way to assemble the components.

Additionally, the soft surface of the sofa components, such as the side surfaces of the frames, armrests, and backrests, can cause the components to bend or compress over time. In some cases, the connecting wedges are installed to the sofa components using one or more bolts. These bolts sometimes not only secure the wedges to the soft surface of the sofa, but also to the inner frame, such as a wooden or metal fixing plate. Once installed, the soft material at the position of the connector is compressed, and the connector is slightly indented and secured to the inner frame. This indented surface area may lead to insufficient space between sofa components to accommodate the connecting wedges. To address for this structural retrieving effect, there exist needs for connecting wedges that are designed to allow for retrieving effect when assembling the sofa components together. This may include a connecting wedge design that may create space for the soft surface to retract or recover its shape, without compromising the stability and strength of the connections and the sofa itself.

Recognized herein are various limitations with connecting wedges and/or connecting wedge assembly. The present disclosure aims to address the shortcomings and technical disadvantages of commercially available sofa assemblies and the connecting wedges and/or connecting wedge assembly by providing connecting wedges and/or connecting wedge assembly that are easy to use and minimize the risk of errors during assembly. The designed connecting wedges and/or connecting wedge assembly also takes into account the bending and retrieving effects of the surfaces of a sofa, ensuring that the connections are stable and strong even when the sofa components bend or compress over time or in the short-term. The presented disclosure improves the overall functionality and quality of the sofa assembly while addressing the structural challenges.

In one aspect, the present disclosure provides a connecting wedge, comprising an installation surface; a first reclined surface; a second reclined surface, wherein the first reclined surface and the second reclined surface are located on opposite sides of the installation surface, respectively; and a connection surface opposite to the installation surface; wherein the first and second reclined surfaces extend from the installation surface to the connection surface such that a distance between the first and second reclined surfaces increases gradually along a direction from the installation surface to the connection surface. In some embodiments, the first and second reclined surfaces are in axial symmetry with each other. In some embodiments, the connecting wedge further comprises a curved surface, wherein the curved surface connects to a first group of ends of the installation surface, the connection surface, the first and second reclined surfaces, wherein the curved surface extends from the installation surface to the connection surface such that a distance between the curved surface and a center of the connecting wedge increases gradually along a direction from the installation surface to the connection surface. In some embodiments, the connecting wedge further comprises a second curved surface, wherein the second curved surface connects to a second group of ends of the installation surface, the connection surface, the first and second reclined surfaces. In some embodiments, the connecting wedge is in a long strip shape. In some embodiments, the connecting wedge further comprises an installation hole. In some embodiments, the connecting wedge further comprises a protruding portion.

In an aspect, the present disclosure provides a connecting wedge assembly, comprising one or more connecting wedge, wherein the connecting wedge comprises: an installation surface; a first reclined surface; a second reclined surface, wherein the first reclined surface and the second reclined surface are located on opposite sides of the installation surface; and a connection surface opposite to the installation surface; wherein the first and second reclined surfaces extend from the installation surface to the connection surface such that a distance between the first and second reclined surfaces increases gradually along a direction from the installation surface to the connection surface. In some embodiments, two of the connecting wedges are configured to be secured side by side to a first support member, thereby forming a slot between the two connecting wedges. In some embodiments, the slot is formed between a first reclined surface of a first connecting wedge and a second reclined surface of a second connecting wedge, with a slot shape that is narrower on an outer side and wider on an inner side of the slot. In some embodiments, the connecting wedge further comprises a curved surface, wherein the curved surface connects to a first group of ends of the installation surface, the connection surface, the first and second reclined surfaces, wherein the curved surface extends from the installation surface to the connection surface such that a distance between the curved surface and a center of the connecting wedge increases gradually along a direction from the installation surface to the connection surface. In some embodiments, a guiding path is formed between the curved surfaces of a first connecting wedge and a second connecting wedge, with a guiding path shape that is wider on a receiving side and narrower on an inserted side of the guiding path. In some embodiments, a guiding path is formed between the curved surfaces of a first connecting wedge and a second connecting wedge, wherein the guiding path is in a funnel shape. In some embodiments, the connecting wedge assembly comprises a third connecting wedge configured to be secured to a second support member, wherein the third connecting wedge is configured to slide into the slot formed between the first and the second connecting wedges, and thereby connect the first support member and the second support member together. In some embodiments, the first and second reclined surfaces are in axial symmetry with each other. In some embodiments, the connecting wedge further comprises an installation hole.

In an aspect, the present disclosure provides a sofa, comprising one or more sofa components, wherein the sofa components are connected by one or more connecting wedge, wherein the connecting wedge comprises: an installation surface; a first reclined surface; a second reclined surface, wherein the first reclined surface and the second reclined surface are located on opposite sides of the installation surface; a connection surface opposite to the installation surface; wherein the first and second reclined surfaces extend from the installation surface to the connection surface such that a distance between the first and second reclined surfaces increases gradually along a direction from the installation surface to the connection surface. In some embodiments, the one or more sofa components comprise a frame and an armrest, wherein the frame and the armrest are configured to be connected by three or more of the connecting wedges. In some embodiments, the one or more sofa components comprise a frame and a backrest, wherein the frame and the backrest are configured to be connected by three or more of the connecting wedges. In some embodiments, the one or more sofa components comprise two or more frames, wherein the two or more frames are configured to be connected to one another by three or more of the connecting wedges. In some embodiments, the connecting wedge further comprises a curved surface, wherein the curved surface connects to a first group of ends of the installation surface, the connection surface, the first and second reclined surfaces, wherein the curved surface extends from the installation surface to the connection surface such that a distance between the curved surface and a center of the connecting wedge increases gradually along a direction from the installation surface to the connection surface.

In as aspect, the present disclosure provides a connecting wedge, comprising a connection surface; a first reclined surface; a second reclined surface, wherein the first reclined surface and the second reclined surface are located on opposite sides of the connection surface, respectively; and a protruding portion; wherein the first and second reclined surfaces extend from the protruding portion to the connection surface such that the distance between the first reclined surface and the second reclined surface gradually increases along the direction from the protruding portion to the connection surface.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The present disclosure addresses the shortcomings and technical disadvantages of traditional sofa connecting wedges and/or connecting wedge assembly, which may compromise easement during production of the wedges, easement during the alignment and/or assembly process, and stability, strength of the connections and the sofa.

Disclosed herein are various examples of sofa connecting wedges and/or connecting wedge assembly that are improved on easement during production of the wedges, easement during the alignment and/or assembly process, and stability, strength of the connections and the sofa.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

Figure 1:
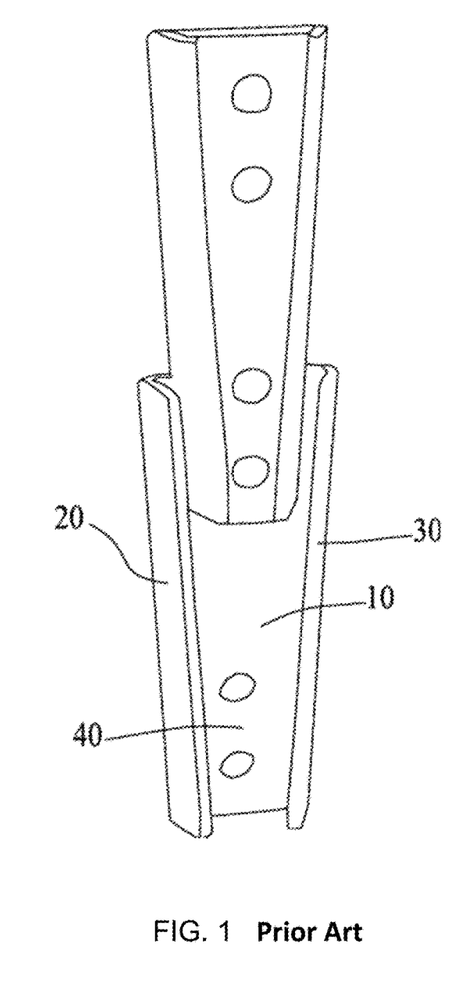
FIG. 1 schematically illustrates a prior art connecting wedge assembly.

FIG. 1 schematically illustrates a prior art connecting wedge assembly. As shown in FIG. 1, in current technology, the connection between sofa components, such as the armrest and frame or between two frames, is typically done using a slot structure where one slot structure is inserted into another. The slot structure is composed of a connecting plate 10, a first side plate 20 and a second side plate 30 set on either side of the connecting plate 10. The distance between the first side plate 20 and the second side plate 30 gradually decreases from one side to the other (e.g., from top to bottom), and the ends of the first side plate 20 and second side plate 30 are bent inward to form limit parts 40. The connecting plate 10, first side plate 20, second side plate 30, and limit parts 40 define a space for insertion, and the other slot structure is inserted into this space. As discussed elsewhere herein, this design has various disadvantages, such as high precision requirements for the manufacturing process, which can make assembly difficult and increase the risk of errors if there are manufacturing errors, and the need for multiple molds or production lines if the slot structures have different shapes, resulting in higher production costs. Additionally, the soft surface of the sofa components, such as the side surfaces of the frames, armrests, and backrests, can cause the components to bend or compress. This may lead to difficulties in alignment when assembling the sofa components together. Additionally or alternatively, the soft surface of the sofa components may lead to insufficient space between sofa components to accommodate the connecting wedges.

To address these shortcomings, the present disclosure provides connecting wedges to be designed to allow for bending effect, retrieving effect when assembling the sofa components together, but still provide stable, strong connections in the long term. Additionally, the connecting wedges used in the connecting assembly, as provided by the present disclosure, may have identical shape, which eliminates the need for multiple molds or production lines, thus reducing the production cost.

Figure 2A:
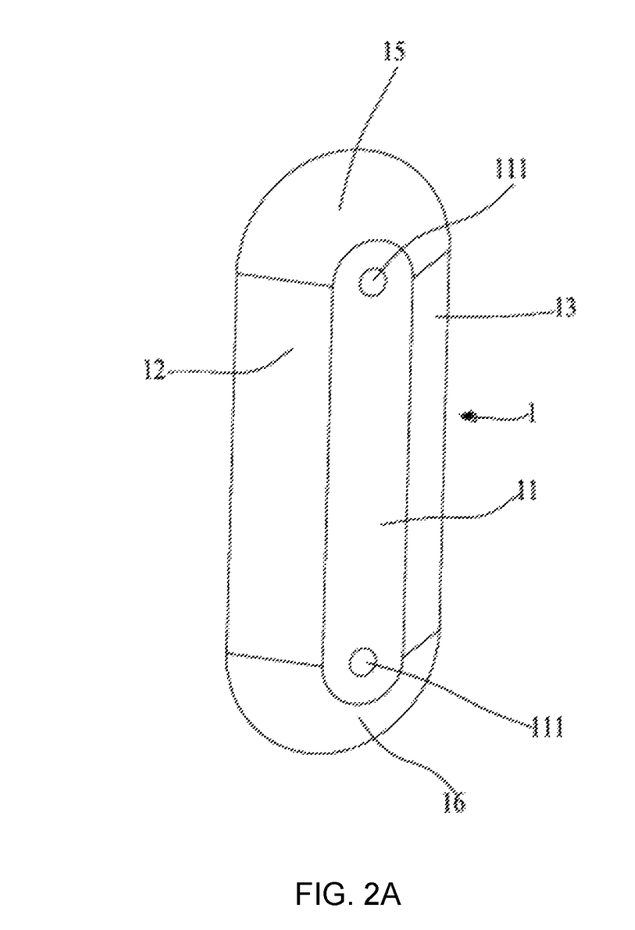
FIG. 2A schematically illustrates a perspective view of a connecting wedge of the present disclosure.
Figure 2B:
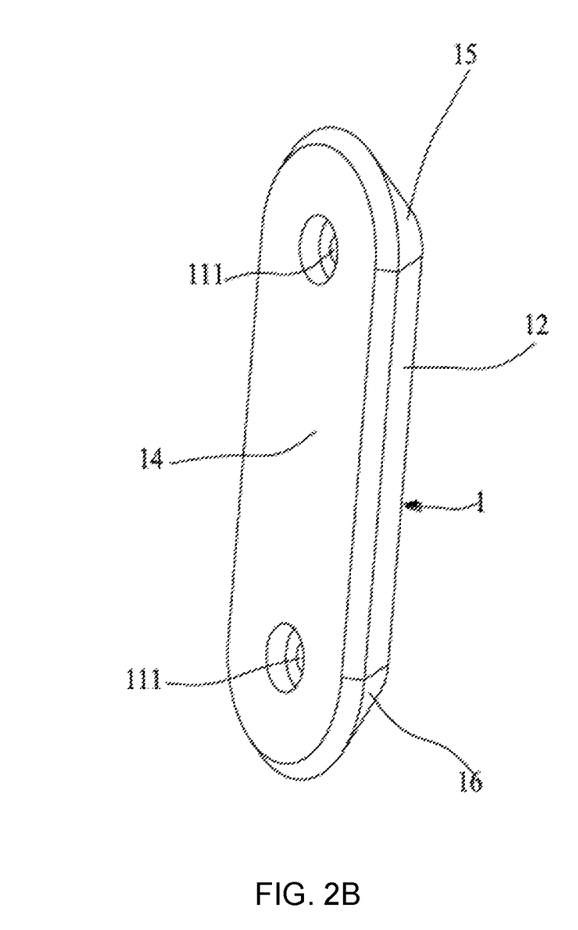
FIG. 2B schematically illustrates a perspective view of a connecting wedge of the present disclosure from an angle that is different than the angle in FIG. 2A.

FIGS. 2A and 2B schematically illustrate perspective views of a connecting wedge 1 of the present disclosure, from two different angles. As shown in FIGS. 2A and 2B, a connecting wedge 1 may comprise an installation surface 11, a first reclined surface 12 and a second reclined surface 13 located on both sides of the installation surface 11, respectively, and a connection surface 14 opposite to the installation surface 11. In some embodiments, the installation surface 11 is parallel to the connection surface 14. In some embodiments, the first reclined surface 12 and the second reclined surface 13 extend from the installation surface 11 to the connection surface 14, in a configuration such that the distance between the first reclined surface 12 and the second reclined surface 13 gradually increases along the direction from the installation surface 11 to the connection surface 14.

In some embodiments, the connecting wedge 1 may further comprise a first curved surface 15 and/or a second curved surface 16. In some embodiments, the connecting wedge 1 may only comprise one curved surface. In some embodiments, the curved surface(s) may be in a semicircle shape. In some embodiments, the curved surface(s) may be in a half ellipse and/or a portion of an ellipse shape. The curved surface(s) may be configured such that it is a reclined shape along the inward direction (i.e., a direction from the connection surface 14 to the installation surface 11), for example, such that the distance between the curved surface and the center of the connecting wedge 1 gradually increases along the direction from the installation surface 11 to the connection surface 14.

In some embodiments, the connecting wedge 1 may comprise an installation hole 111, which may pass through both the connection surface 14 and installation surface 11 of the connecting wedge 1, to secure the connecting wedge 1 to a support member or structure (e.g., a surface of a sofa component). In some embodiments, a bolt or a screw (not shown in the figures) may be utilized to secure connecting wedge 1 to the support member or structure. In some embodiments, the installation hole 111 may have a bigger opening on the connection surface 14 compared to the opening on the installation surface 11, which may allow for accommodation of the bigger head portion of a screw, without protrusion above the connection surface 14. In some embodiments, the connecting wedges are secured to the support member or structure (e.g., sofa components) at the factory before shipping out to a store or an end user, such that no extra tools will be required to install the connecting wedges. In some embodiments, the first reclined surface 12 and the second reclined surface 13 may be in axial symmetry with each other, i.e., they may be formed as symmetrically set with respect to the center axis of the connecting wedge 1. This allows for better contact between the connecting wedges in an assembled state, i.e., this may result in a larger contact area between connecting wedges, and therefore provide a more stable and reliable connection.

Figure 3:
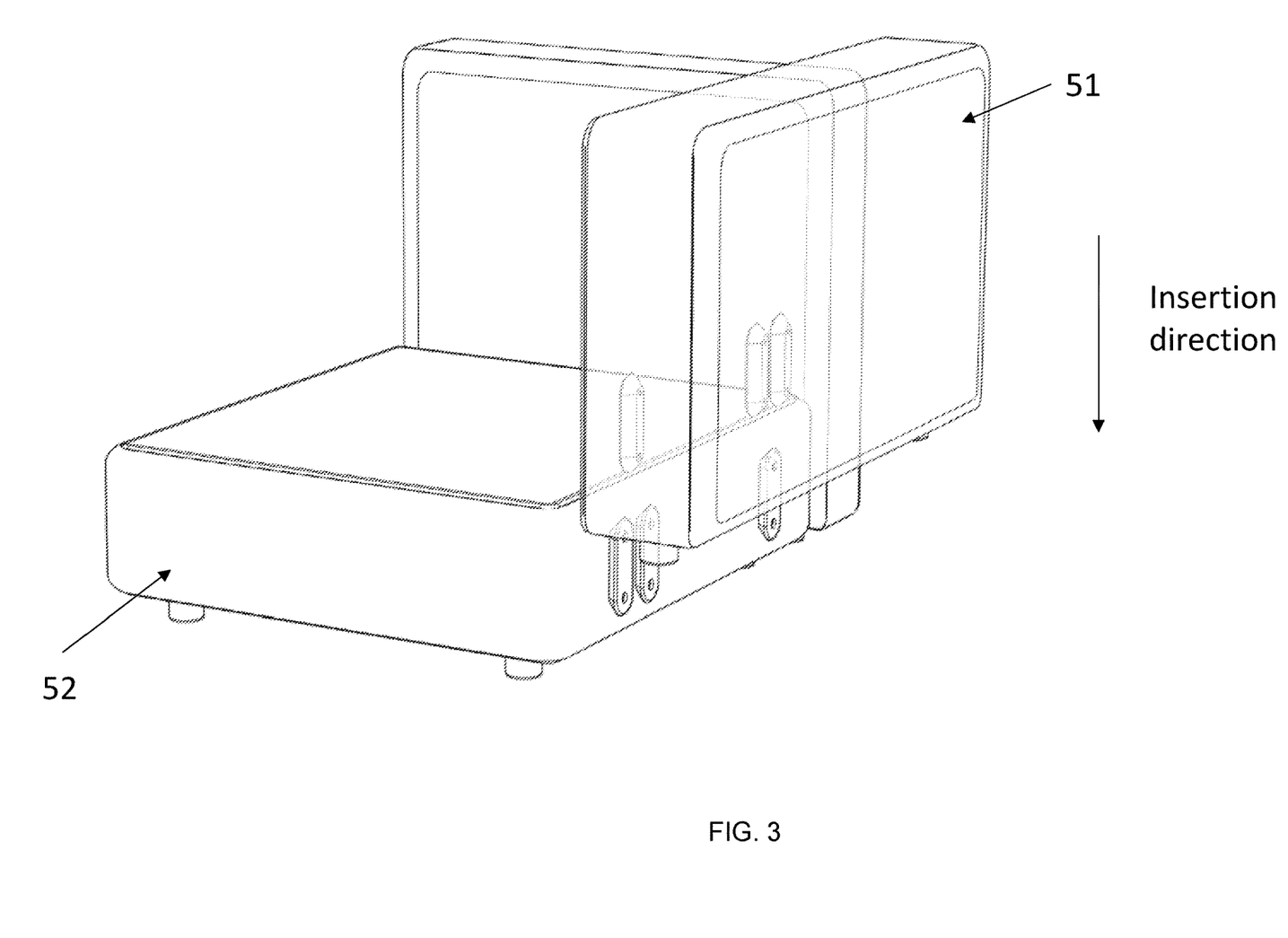
FIG. 3 schematically illustrates a perspective view of a sofa assembly and the attached connecting wedge assembly of the present disclosure.

FIG. 3 schematically illustrates a perspective view of a sofa assembly and the attached connecting wedge assembly of the present disclosure. As shown in FIG. 3, a sofa assembly may be in the process of being assembled. A side component 51 (e.g., an armrest) may be connected with a frame 52. As shown in FIG. 3, the frame 52 and the side component 51 may each have a group of connecting wedges secured on the surface. An end user may simply connect the two sofa components by aligning the group of connecting wedges and inserting/sliding the connect wedge into the corresponding receiving slot (which may be formed by two connecting wedges). Details of the connecting wedge assembly are described in connection with other figures in the present disclosure.

Figure 4:
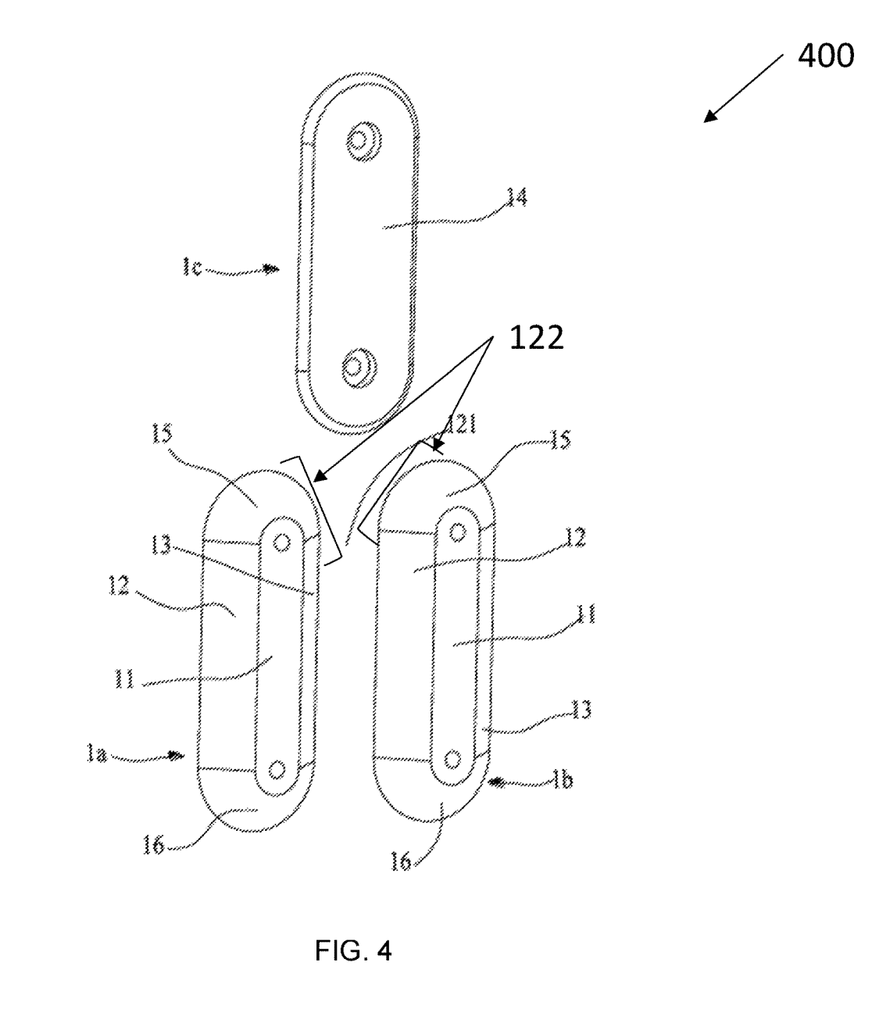
FIG. 4 schematically a perspective view of a connecting wedge assembly of the present disclosure.

FIG. 4 schematically a perspective view of a connecting wedge assembly of the present disclosure. In some embodiments, the connecting wedge assembly 400 comprises a group of connecting wedges, for example, connecting wedges 1a, 1b, and 1c. In some embodiments, the connecting wedges 1 are used in group(s), each connecting wedge may correspond to and/or contact with a portion of other connecting wedges. For example, when using the connecting wedges 1, two connecting wedges 1 may be fixed (i.e., secured) side by side on a support element (such as a sofa component). In some embodiments, two connecting wedges 1 may be secured in parallel to each other along the long side of the wedges. As shown in FIG. 4, a slot (i.e., space, opening) 121 may be formed between the first connecting wedge 1a's second reclined surface 13 and the second connecting wedge 1b's first reclined surface 12, with the width of the slot 121 gradually increasing along the direction from the connection surfaces 14 to the installation surfaces 11 (i.e. narrower on the outer and wider on the inner). This may form a locking position when the corresponding connecting wedge 1C is inserted in the slot 121. The width of the slot 121 is generally matched with the width of a third connecting wedge 1c, which is fixed on another support element and has a width that gradually decreases from the connection surface 14 to the installation surface 11 (i.e. wider on the outer and narrower on the inner), and the third connecting wedge 1c may be inserted into the slot 121 to form a connection. Therefore, by using the connecting wedges 1 in combination, the connection is easy and simple to assemble, and only one mold is needed for producing the corresponding connecting wedges 1, resulting in lower production costs.

In some embodiments, the first reclined surface 12 and the second reclined surface 13 may be symmetrically arranged (and/or manufactured) along the long edge, such that they are in axial symmetry with each other. This may provide the advantages such that when assembled, the first connecting wedge 1a's second reclined surface 13 and the third connecting wedge 1c's first reclined surface 12 have a large contact area, making the connection sturdy and reliable. The example of contact surface area between the first connecting wedge 1a's second reclined surface 13 and the third connecting wedge 1c's first reclined surface 12 is provided solely to explain the benefits, other contact surface areas between the reclined surfaces may also enjoy the same benefits, for example, the second connecting wedge 1b's first reclined surface 12 and the third connecting wedge 1c's second reclined surface 13.

To facilitate the insertion of the third connecting wedge 1c into the slot 121 formed between the two connecting wedges 1a and 1b, the connecting wedge 1 may comprise a first curved surface 15. Optionally, the connecting wedge 1 may also comprise a second curved surface 16. The first curved surface 15 connects to one side of the first reclined surface 12, the second reclined surface 13, the installation surface 11, and the connection surface 14. In some embodiments, the second curved surface 16 connects to the other side of the first reclined surface 12, the second reclined surface 13, the installation surface 11, and the connection surface 14. The curved surface(s) may be configured such that it is a reclined shape, for example, such that the distance between the curved surface to the center of the connecting wedge 1 gradually increases along the direction from the installation surface 11 to the connection surface 14.

As shown in FIG. 4, the curved surface 15 of connecting wedge 1a and connecting wedge 1b may form a guiding path 122, wherein the guiding path 122 may allow for easy alignment when assembling the sofa components together. The curved shape of the curved surfaces 15 forms a wide opening on the top of the slot 121, which may provide smooth alignment because this tilt-shaped guiding path naturally provides the force that guides the to-be-inserted connecting wedge (e.g., connecting wedge 1c). In some embodiments, the guiding path may have a shape that is wider on a receiving side and narrower on an inserted side of the guiding path, such as a funnel shape. This way, when the third connecting wedge 1c is inserted into the slot 121 formed between the two connecting wedges 1, the third connecting wedge 1c's curved surface can slide onto the first curved surfaces 15 of the first connecting wedge 1a and/or the second connecting wedge 1b, making it easy to insert the third connecting wedge 1c into the slot 121, and making the installation quick and easy.

By incorporating a guiding path 122, the connecting wedge 1c can be easily inserted into the slot 121, even if the slot 121 is not perfectly aligned on the surface of the sofa component due to the bending effect of the soft material. In some cases, even if the wedge is secured to the sofa components with only one bolt/screw, the guiding path 122 and the force it provides may still guiding the insertion without difficulty. In some cases, even if the wedges rotate in a small degree (e.g., less than 60°, 55°, 50°, 45°, 40°, 35°, 30°, 25°, 20°, 15°, 10°, 5°) from its original position, the force when inserting a third wedge along the guiding path 122 may push them back to the original position and thereby secure the sofa components together. This design allows for greater ease of use and a more efficient assembly process, as the connecting wedges can be inserted without needing to be perfectly aligned beforehand. Additionally, this design also reduces the need for additional bolts/screws for securing the wedges in place, resulting in a more cost-effective option. Additionally, the ability for the wedges to rotate slightly before being secured may also help to prevent damage to the sofa components during installation. Overall, the guiding path and the force it provides allows for greater flexibility and ease in the assembly process, while still ensuring a secure connection between the sofa components Additionally, the use of this connecting wedge assembly not only allows for easy assembly, but it may also eliminate any bending or warping at the connecting portion or adjacent areas of the sofa components. This is because the three wedges work together to form a uniform and stable connection, holding the sofa components securely in place and eliminating any movement or shifting. This ensures that the sofa maintains its structural integrity and provides a comfortable and stable seating experience for users.

In some embodiments, the connecting wedge 1 may only comprise one curved surface, with the other end not curved. When securing the connecting wedge 1 to the support element, the direction of connecting wedges may be configured such that the curved surfaces face opposing directions. For example, in FIG. 4, only the lower end of the wedge 1c may be curved, with the upper ends of the wedges 1a and 1b being curved. The wedges may still be identical shapes, with one end of curved surface and one end without curved surface, and can still provide the benefit of the guiding path 122. The design with only one curved surface may provide several benefits, such as lower manufacturing costs due to the use of less material; simplified manufacturing process as less precision is required in creating the curved surface; reduced weight and size of the connecting wedge, making it easier to handle and install; lower inventory costs as less raw materials need to be kept on hand, etc.

The design having two curved surfaces, on the other hand, allows for more flexibility and precision during installation, as the workers do not need to choose the appropriate direction to install the wedges so to facilitate the insertion to be occurred. This can help prevent mistakes and ensure that the connecting wedge is properly and securely installed to the sofa component.

In some embodiments, the connecting wedge 1 may be designed to be a long strip shape, however, the connecting wedge 1 can also be other shapes, without limitation. To facilitate the fixation of the connecting wedge 1 to the support element, an installation hole 111 may be provided on the installation surface 11 of the connecting wedge 1, which can be securely connected to the support element through a screw passing through the installation hole 111. In some embodiments, a bolt or a screw (not shown in the figures) may be utilized to secure connecting wedge 1 to the support structure. In some embodiments, the installation hole 111 may have a bigger opening on the connection surface 14 compared to the opening on the installation surface 11, which may allow for accommodation of the bigger head portion of a screw, without protrusion above the connection surface 14. In some embodiments, the connecting wedges are secured to the support element (e.g., sofa components) at the factory before shipping out to a store or an end user, such that no extra tools will be required to install the connecting wedges.

The above embodiments illustrate the two connecting wedges being set side by side and the third connecting wedge being inserted into the slot formed between them. Other combination patterns can be deduced based on this connecting component pattern, such as three connecting wedges being set side by side and forming two slots, each slot being inserted with connecting wedges, etc. These combinations and other more combination patterns are not described in many details here.

Figure 5A:
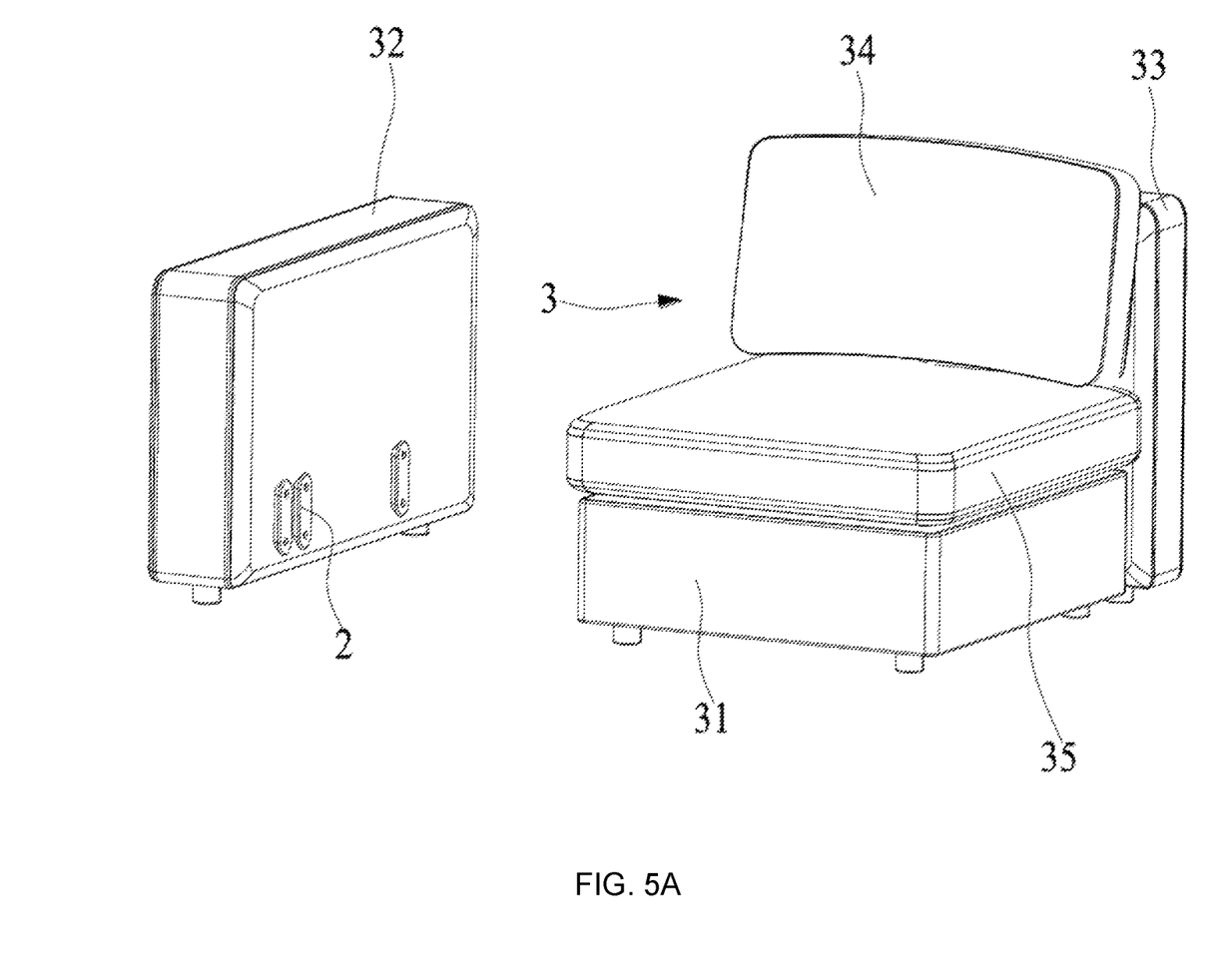
FIG. 5A schematically illustrates a perspective view of a sofa assembly and the attached connecting wedge assembly of the present disclosure.
Figure 5B:
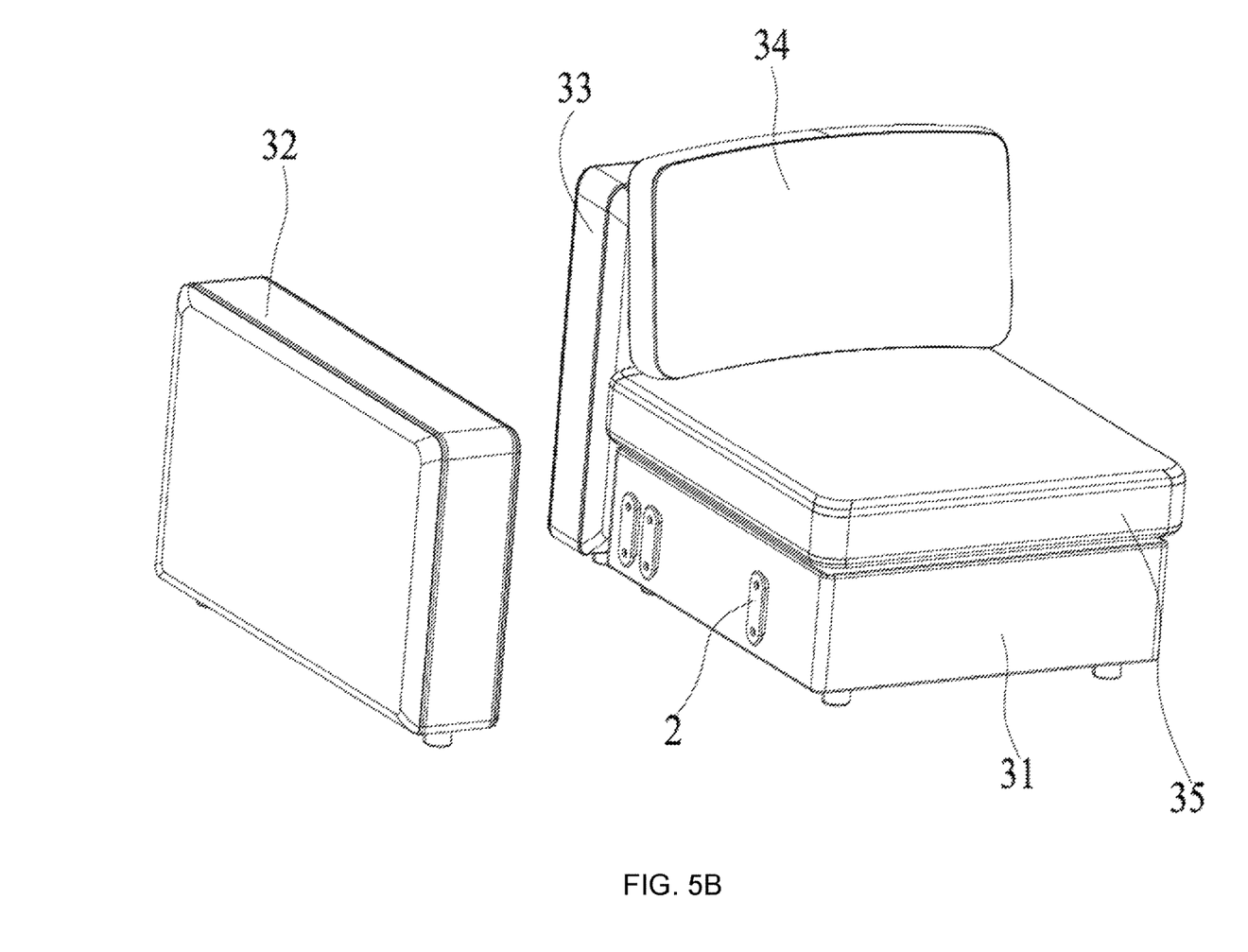
FIG. 5B schematically illustrates a perspective view of a sofa assembly and the attached connecting wedge assembly of the present disclosure from an angle that is different than the angle in FIG. 5A.

FIG. 5A schematically illustrates a perspective view of a sofa assembly and the attached connecting wedge assembly of the present disclosure. FIG. 5B schematically illustrates a perspective view of a sofa assembly and the attached connecting wedge assembly of the present disclosure from an angle that is different than the angle in FIG. 5A. As shown in FIG. 5A and FIG. 5B, a sofa 3 disclosed in present disclosure may include the aforementioned connecting wedge assembly with wedge group 2, which may connect the sofa components. In some embodiments, the connecting wedges 1 are used in group(s) 2, each connecting wedges 1 may correspond to a portion of other connecting wedge 1. For example, when using the connecting wedges 1, two connecting wedges 1 may be fixed (i.e., secured) side by side on a support element (such as a sofa component). In some embodiments, two connecting wedges 1 may be secured in parallel to each other along the long side of the wedges. Referring back to FIG. 4, a slot (i.e., space, opening) 121 may be formed between the first connecting wedge 1a's second reclined surface 13 and the second connecting wedge 1b's first reclined surface 12, with the width of the slot 121 gradually increasing from the connection surfaces 14 to the installation surfaces 11 (i.e. narrower on the outer and wider on the inner). The width of the slot 121 is generally matched with the width of a third connecting wedge 1c, which is fixed on another support element and has a width that gradually decreases from the connection surface 14 to the installation surface 11 (i.e. wider on the outer and narrower on the inner), and the third connecting wedge 1c may be inserted into the slot 121 to form a connection. As shown in FIG. 5A and FIG. 5B, the sofa component may comprise a frame 31 and an armrest 32, a connecting wedge group 2 can be configured/secured on side surfaces of the frame 31 and the armrest 32, to make it easy to install the armrest 32 on the frame 31.

Figure 6A:
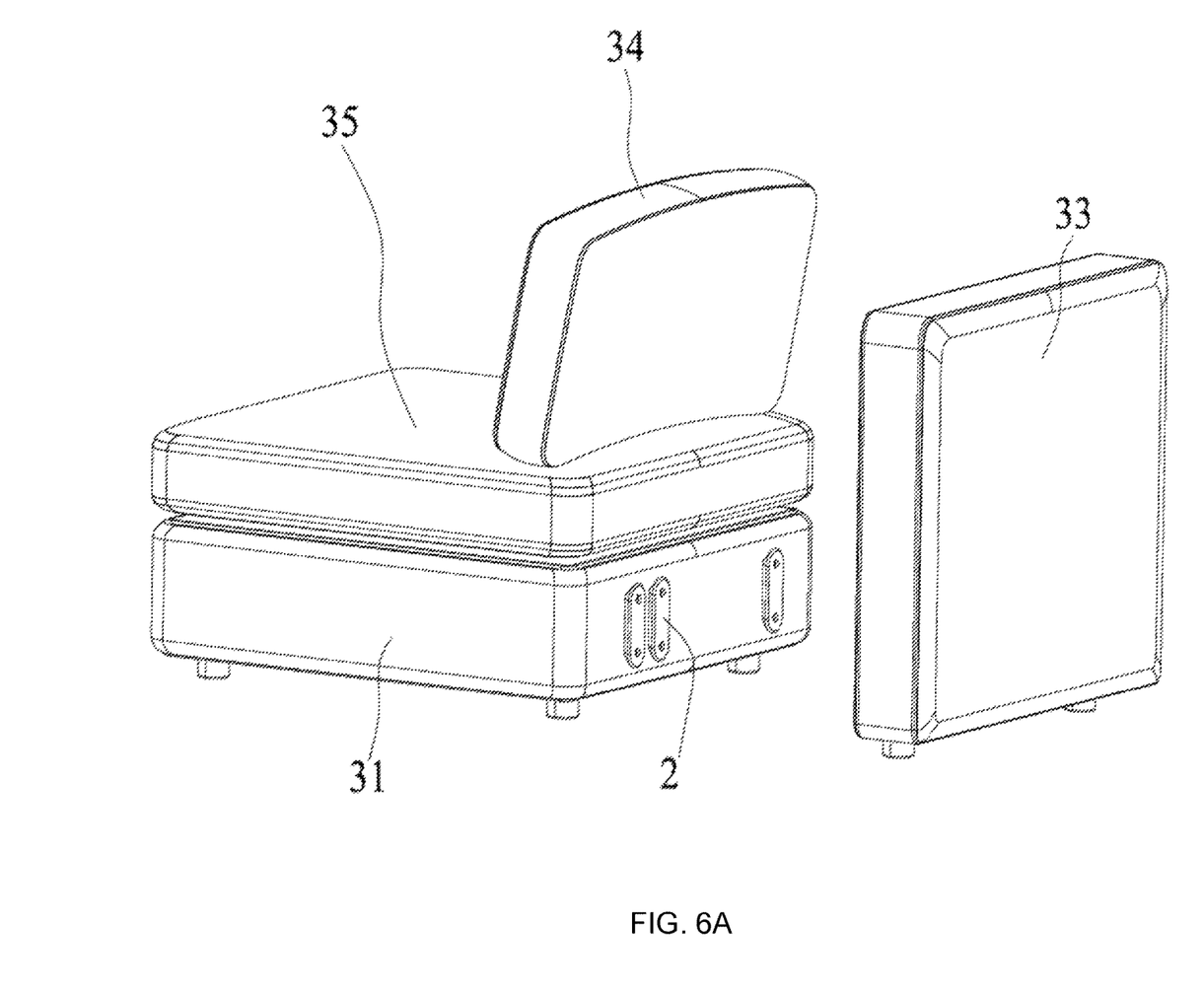
FIG. 6A schematically illustrates a perspective view of a sofa assembly and the attached connecting wedge assembly of the present disclosure.
Figure 6B:
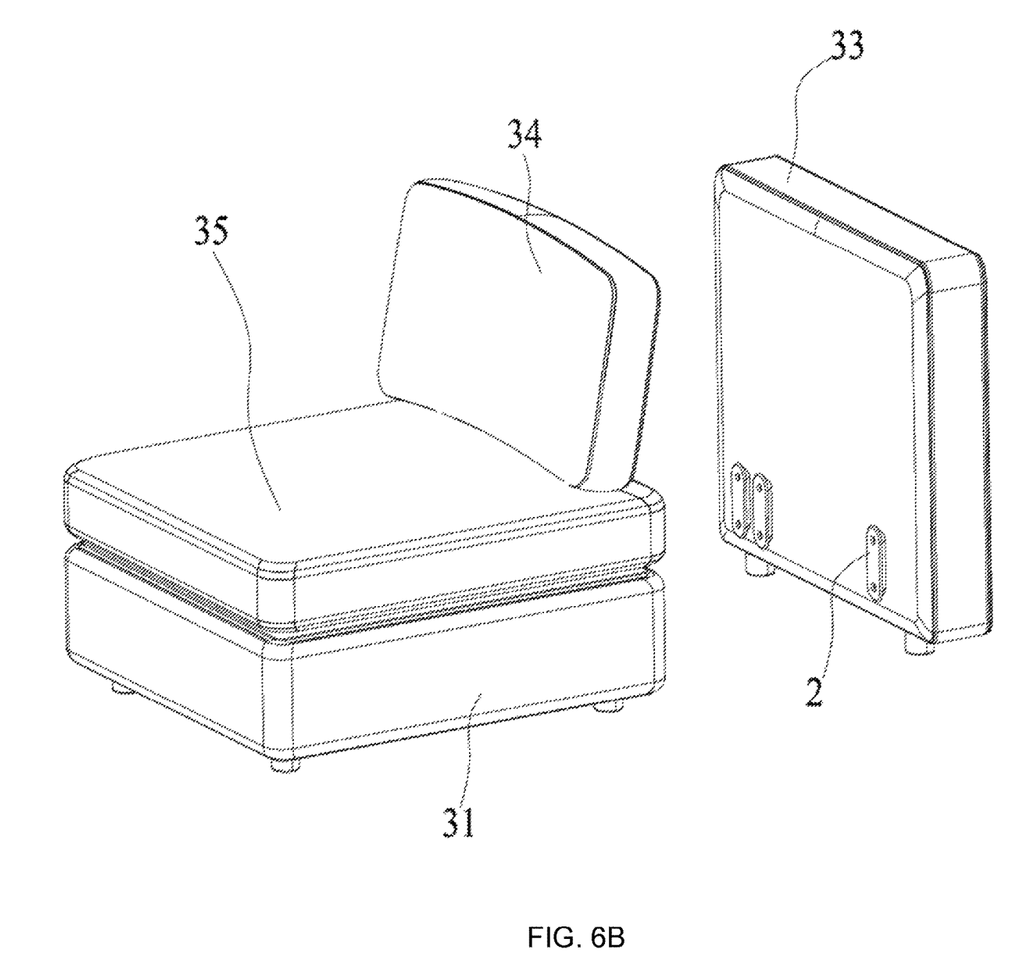
FIG. 6B schematically illustrates a perspective view of a sofa assembly and the attached connecting wedge assembly of the present disclosure from an angle that is different than the angle in FIG. 6A.

FIG. 6A schematically illustrates a perspective view of a sofa assembly and the attached connecting wedge assembly of the present disclosure. FIG. 6B schematically illustrates a perspective view of a sofa assembly and the attached connecting wedge assembly of the present disclosure from an angle that is different than the angle in FIG. 6A. As shown in FIG. 6A and FIG. 6B, the sofa components may comprise a frame 31 and a backrest 33, a connecting wedge group 2 can be configured/secured on side surfaces of the frame 31 and the backrest 33, to make it easy to install the backrest 33 on the frame 31. A cushion 34 may be placed in front of backrest 33 after the backrest 33 is secured to the frame 31.

Figure 7A:
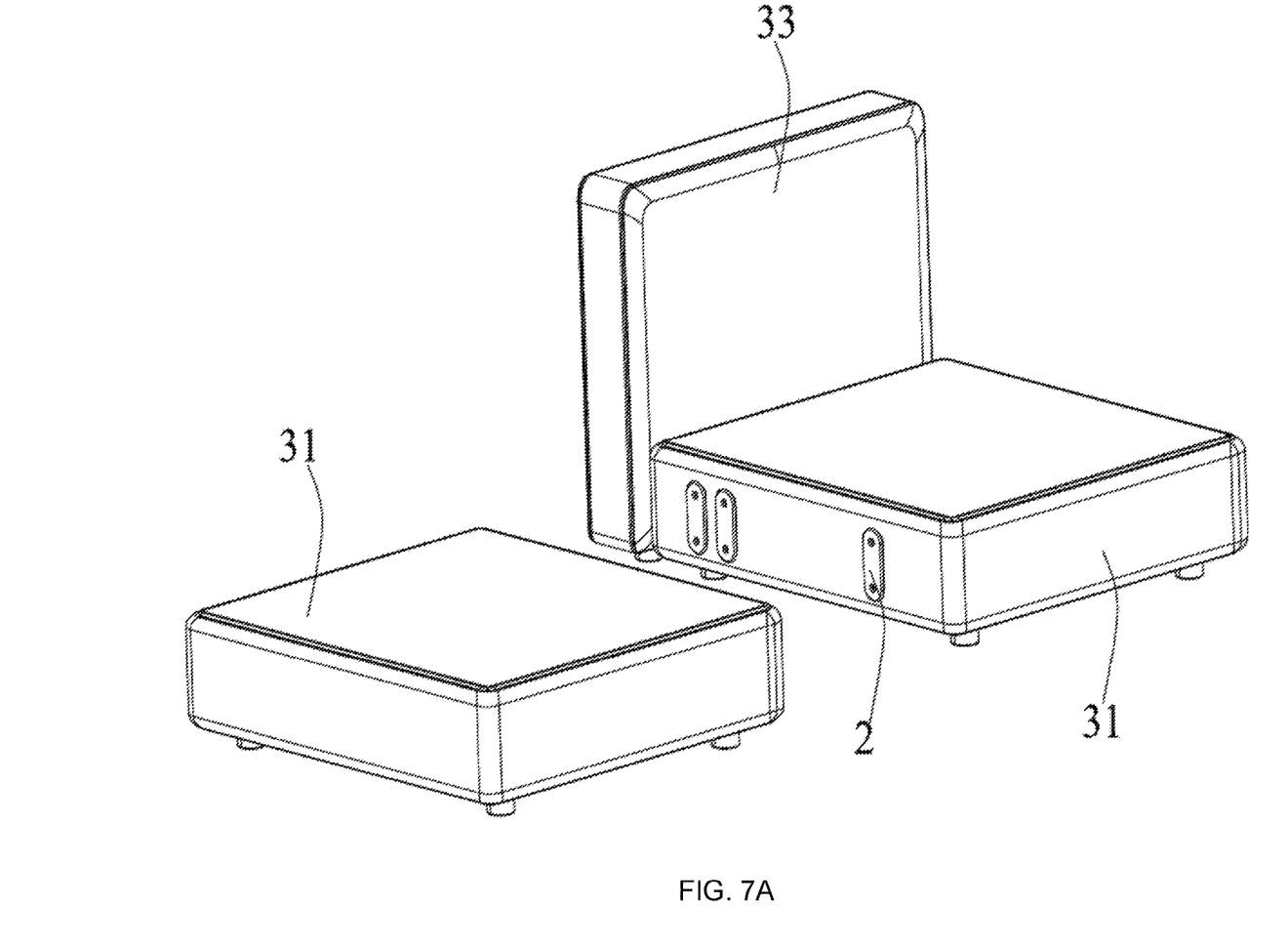
FIG. 7A schematically illustrates a perspective view of a sofa assembly and the attached connecting wedge assembly of the present disclosure.
Figure 7B:
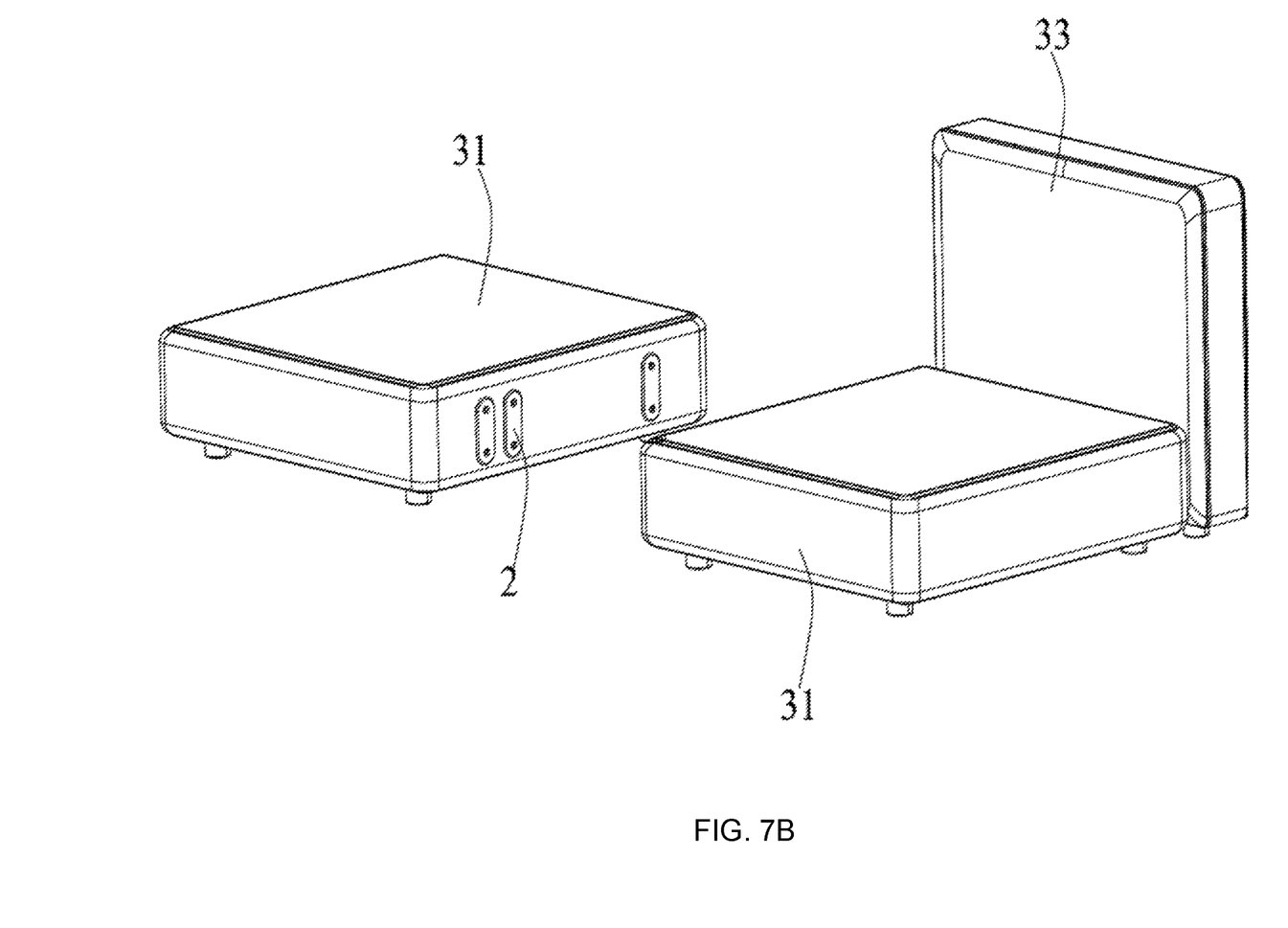
FIG. 7B schematically illustrates a perspective view of a sofa assembly and the attached connecting wedge assembly of the present disclosure from an angle that is different than the angle in FIG. 7A.

FIG. 7A schematically illustrates a perspective view of a sofa assembly and the attached connecting wedge assembly of the present disclosure. FIG. 7B schematically illustrates a perspective view of a sofa assembly and the attached connecting wedge assembly of the present disclosure from an angle that is different than the angle in FIG. 7A. As shown in FIG. 7A and FIG. 7B, the sofa components may comprise a frame 31 and another frame 31, a connecting wedge group 2 can be configured/secured on side surfaces of the frames 31, to make it easy to install one frame 31 on the other frame 31.

Figure 8A:
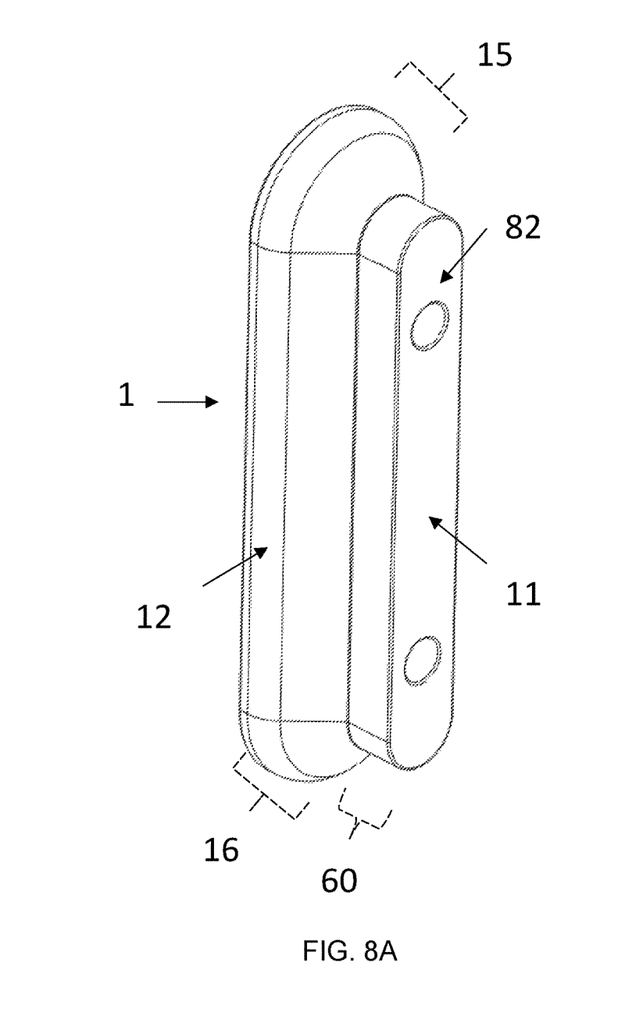
FIG. 8A schematically illustrates a perspective view of a connecting wedge of the present disclosure.
Figure 8B:
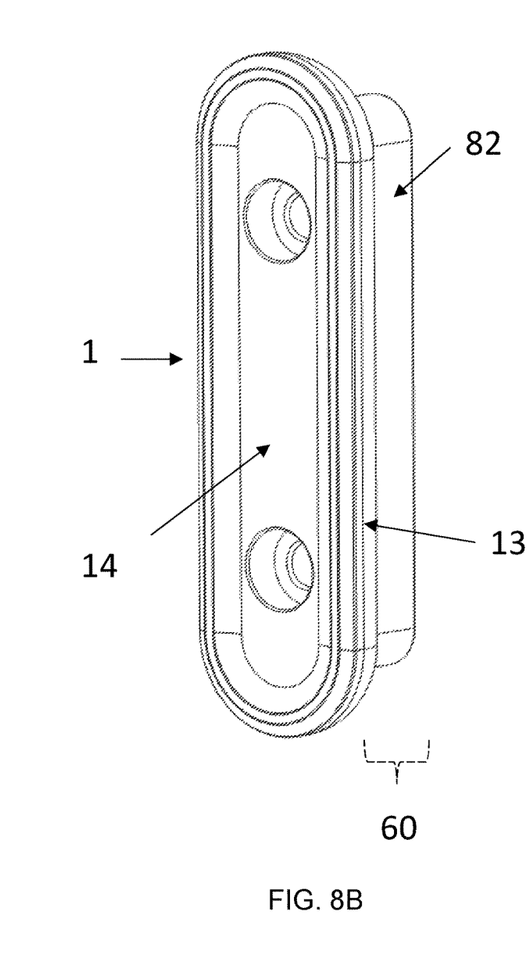
FIG. 8B schematically illustrates a perspective view of a connecting wedge of the present disclosure from an angle that is different than the angle in FIG. 8A.

FIG. 8A schematically illustrates a perspective view of a connecting wedge of the present disclosure. FIG. 8B schematically illustrates a perspective view of a connecting wedge of the present disclosure from an angle that is different than the angle in FIG. 8A. As shown in FIG. 8A and FIG. 8B, the connecting wedge 1 may further comprise a protruding portion 82. In some embodiments, the protruding portion 82 may be on the installation surface 11 of the connecting wedge 1. In some embodiments, the protruding portion 82 may be formed in lieu of the installation surface 11 of the connecting wedge 1. In some embodiments, the outer surface of the protruding portion 82 forms the installation surface 11. As described elsewhere herein, the soft surface of the sofa components, such as the side surfaces of the frames, armrests, and backrests, can cause the components to bend or compress. For example, in some cases, the connecting wedges are installed to the sofa components using one or more bolts. These bolts sometimes not only secure the wedges to the soft surface of the sofa, but also to the inner frame, such as a wooden or metal fixing plate. Once installed, the soft material at the position of the connector is compressed, and the connector is slightly indented and secured to the inner frame. This indented surface area may lead to insufficient space between sofa components to accommodate the connecting wedges. To address for this structural retrieving effect, a protruding portion 82 may be added to the back of the connector. This protruding portion 82 may touch (and be secured to) the surface of the sofa (fabric) and increase the space between the connector and the sofa component. As shown in FIGS. 8A and 8B, the connecting wedge 1 may comprise a first reclined surface 12 and a second reclined surface 13 located on both side of a connection surface 14, respectively. In some embodiments, the connection surface 14 is opposite to the protruding portion 82. Alternatively or additionally, the connection surface 14 is opposite to an installation surface 11 on the protruding portion 82. In some embodiments, the installation surface 11 is parallel to the connection surface 14. In some embodiments, the first reclined surface 12 and the second reclined surface 13 extend from the protruding portion 82 to the connection surface 14, in a configuration such that the distance between the first reclined surface 12 and the second reclined surface 13 gradually increases along the direction from the protruding portion 82 to the connection surface 14. Element 60 indicates a thickness of the protruding portion 82. In some embodiments, the thickness of the protruding portion 82 may be customized and/or configured to accommodate different designs of the sofa. For example, the thickness of the protruding portion 82 may be based on the softness of the sofa surface. In some embodiments, the connecting wedge 1 may further comprise a first curved surface 15 and/or a second curved surface 16. In some embodiments, the connecting wedge 1 may only comprise one curved surface. In some embodiments, the curved surface(s) may be in a semicircle shape. In some embodiments, the curved surface(s) may be in a half ellipse and/or a portion of an ellipse shape. The curved surface(s) may be configured such that it is a reclined shape along the inward direction (i.e., a direction from the connection surface 14 to the protruding portion 82), for example, such that the distance between the curved surface and the center of the connecting wedge 1 gradually increases along the direction from the protruding portion 82 to the connection surface 14.

By adding a protruding portion 82 on the back of the connecting wedge, the soft material at the position of connecting wedge will still be compressed after installation, but the protruding portion will prevent the denting of the connecting wedge and ensure sufficient space between the inclined surface and the sofa surface. This design can improve the overall stability and longevity of the connection between the sofa components.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A connecting wedge assembly, comprising:
   at least three connecting wedges, wherein each of the at least three connecting wedges comprises:
   an installation surface;
   a first reclined surface;
   a second reclined surface, wherein the first reclined surface and the second reclined surface are located on opposite sides of the installation surface; and a connection surface opposite to the installation surface;

wherein the first and second reclined surfaces extend from the installation surface to the connection surface such that a distance between the first and second reclined surfaces increases gradually along a direction from the installation surface to the connection surface, wherein at least a first connecting wedge and a second connecting wedge of the at least three connecting wedges are configured to be secured side by side to a first support member, thereby forming a slot between the first connecting wedge and the second connecting wedge, and wherein a third connecting wedge of the at least three connecting wedges is configured to be secured to a second support member and slide into the slot formed between the first connecting wedge and the second connecting wedge, and thereby connect the first support member and the second support member together.

2. The connecting wedge assembly of claim 1, wherein the slot is formed between the first reclined surface of the first connecting wedge and the second reclined surface of the second connecting wedge, with a slot shape that is narrower on an outer side and wider on an inner side of the slot.

3. The connecting wedge assembly of claim 1, wherein the each of the at least three connecting wedges further comprises a first curved surface, wherein the first curved surface connects to a first group of ends of the installation surface, the connection surface, the first and second reclined surfaces, wherein the first curved surface extends from the installation surface to the connection surface such that a distance between the first curved surface and a center of the each of the at least three connecting wedges increases gradually along a direction from the installation surface to the connection surface.

4. The connecting wedge assembly of claim 3, wherein a guiding path is formed between the curved surfaces of a first connecting wedge and a second connecting wedge, with a guiding path shape that is wider on a receiving side and narrower on an inserted side of the guiding path.

5. The connecting wedge assembly of claim 3, wherein a guiding path is formed between the curved surfaces of a first connecting wedge and a second connecting wedge, wherein the guiding path is in a funnel shape.

6. The connecting wedge assembly of claim 3, wherein the each of the at least three connecting wedges further comprises a second curved surface, wherein the second curved surface connects to a second group of ends of the installation surface, the connection surface, the first and second reclined surfaces.

7. The connecting wedge assembly of claim 1, wherein the first and second reclined surfaces are in axial symmetry with each other.

8. The connecting wedge assembly of claim 1, wherein the each of the at least three connecting wedges further comprises an installation hole.

9. The connecting wedge assembly of claim 1, wherein the each of the at least three connecting wedges is in a long strip shape.

10. The connecting wedge assembly of claim 9, wherein a length of the each of the at least three connecting wedges is longer than a width of the each of the at least three connecting wedges.

11. The connecting wedge assembly of claim 10, wherein a first connecting wedge and a second connecting wedge of the at least three connecting wedges are configured to be secured in parallel to each other along the longer side of the wedges.

12. The connecting wedge assembly of claim 1, wherein the each of the at least three connecting wedges further comprises a protruding portion.

13. The connecting wedge assembly of claim 1, wherein the at least three connecting wedges are identical.

14. A sofa, comprising:
one or more sofa components, wherein the one or more sofa components are connected by at least three connecting wedges, wherein each of the at least three connecting wedges comprises:
an installation surface;
a first reclined surface;
a second reclined surface, wherein the first reclined surface and the second reclined surface are located on opposite sides of the installation surface;
a connection surface opposite to the installation surface;
wherein the first and second reclined surfaces extend from the installation surface to the connection surface such that a distance between the first and second reclined surfaces increases gradually along a direction from the installation surface to the connection surface,
wherein at least a first connecting wedge and a second connecting wedge of the at least three connecting wedges are configured to be secured side by side to a first support member, thereby forming a slot between the first connecting wedge and the second connecting wedge, and
wherein a third connecting wedge of the at least three connecting wedges is configured to be secured to a second support member and slide into the slot formed between the first connecting wedge and the second connecting wedge, and thereby connect the first support member and the second support member together.

15. The sofa of claim 14, wherein the one or more sofa components comprise two or more frames, wherein the two or more frames are configured to be connected to one another by three or more of the connecting wedges.

16. The sofa of claim 14, wherein the each of the at least three connecting wedges further comprises a curved surface, wherein the curved surface connects to a first group of ends of the installation surface, the connection surface, the first and second reclined surfaces, wherein the curved surface extends from the installation surface to the connection surface such that a distance between the curved surface and a center of the each of the at least three connecting wedges increases gradually along a direction from the installation surface to the connection surface.

17. The connecting wedge assembly of claim 1, wherein the each of the at least three connecting wedges further comprises an installation hole.

18. The sofa of claim 14, wherein the one or more sofa components comprise a frame and an armrest, wherein the frame and the armrest are configured to be connected by three or more of the connecting wedges.

19. The sofa of claim 14, wherein the one or more sofa components comprise a frame and a backrest, wherein the frame and the backrest are configured to be connected by three or more of the connecting wedges.

* * * * *